United States Patent
Wu et al.

(10) Patent No.: US 10,222,815 B2
(45) Date of Patent: Mar. 5, 2019

(54) METHOD AND DEVICE FOR ESTIMATING STATE OF POWER SYSTEM

(71) Applicant: Tsinghua University, Beijing (CN)

(72) Inventors: Wenchuan Wu, Beijing (CN); Boming Zhang, Beijing (CN); Hongbin Sun, Beijing (CN); Weiye Zheng, Beijing (CN); Qinglai Guo, Beijing (CN); Bin Wang, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 277 days.

(21) Appl. No.: 15/331,876

(22) Filed: Oct. 23, 2016

(65) Prior Publication Data
US 2017/0220521 A1    Aug. 3, 2017

(30) Foreign Application Priority Data

Jan. 30, 2016 (CN) .......................... 2016 1 0067806

(51) Int. Cl.
| | | |
|---|---|---|
| G06F 17/50 | (2006.01) | |
| G05F 1/66 | (2006.01) | |
| G05B 23/02 | (2006.01) | |
| G06F 17/11 | (2006.01) | |

(52) U.S. Cl.
CPC .............. G05F 1/66 (2013.01); G05B 23/02 (2013.01); G06F 17/11 (2013.01)

(58) Field of Classification Search
USPC .......................... 703/2, 19; 375/265; 355/55
See application file for complete search history.

(56) References Cited

U.S. PATENT DOCUMENTS

| | | | | |
|---|---|---|---|---|
| 6,690,739 B1* | 2/2004 | Mui | ...................... | H04L 1/0054 375/265 |
| 2011/0181855 A1* | 7/2011 | Bittner | ................ | G03F 7/70266 355/55 |
| 2014/0032187 A1* | 1/2014 | Legbedji | .............. | G05B 13/042 703/2 |
| 2015/0199010 A1* | 7/2015 | Coleman | .............. | A61B 5/0006 345/156 |

* cited by examiner

*Primary Examiner* — Thai Q Phan
(74) *Attorney, Agent, or Firm* — Hodgson Russ LLP

(57) ABSTRACT

A method and a device for estimating a state of a power system are provided. The method includes: dividing the power system into a plurality of sub-systems; establishing a first linear model of the power system for a first stage; solving the first linear model by an alternating direction multiplier method to obtain the intermediate state variables of each sub-system; performing a nonlinear transformation at a second stage on the intermediate state variables to obtain intermediate measured values; establishing a second linear model of the power system for a third stage according to the intermediate measured values; and solving the third linear model by the alternating direction multiplier method to obtain the final state variables of each sub-system.

14 Claims, 2 Drawing Sheets

METHOD AND DEVICE FOR ESTIMATING STATE OF POWER SYSTEM

CROSS-REFERENCE TO RELATED APPLICATION

This application claims priority to and benefits of Chinese Patent Application No. 201610067806.1, filed with the State Intellectual Property Office of P. R. China on Jan. 30, 2016, the entire content of which is incorporated herein by reference.

FIELD

The present disclosure relates to the field of power system operation and control technology, and more particularly, to a method and a device for estimating a state of a power system.

BACKGROUND

The state estimation of the power system is an optimal estimation for state variables of the power system according to a certain state estimation model in combination with a power system model after removing bad data from measured values obtained by a data collecting and monitoring system. In an energy management system, the state estimation plays an important role and is an important cornerstone for subsequent advanced applications. However, with the increasing scale of the power system, this centralized management system in the related art will face following problems.

(1) Mass information: a huge grid scale of the power system causes communication congestion and a bottleneck of processing information;

(2) Maintenance: the number of interconnected sub-systems is large, alien changes are frequent, and it is difficult for the control center to maintain a global model of the entire power system in real time;

(3) Privacy: different sub-systems may belong to different operators, and as trade secrets, it is difficult for the control center to collect all the information of each sub-system.

SUMMARY

Embodiments of the present disclosure provide a method for estimating a state of a power system, which is performed by one or more computing devices and includes: S1, dividing the power system into a plurality of sub-systems, each of the plurality of sub-systems comprising one or more buses as one or more nodes; S2, establishing a first linear model of the power system for a first stage, the first linear model comprising a first target function and a first constraint condition, the first target function ensuring minimizing a sum of first residual squares and first penalty terms of the plurality of sub-systems, the first residual square being obtained according to intermediate state variables of each sub-system, the first penalty term ensuring bad data sparsity at the first stage, the first constraint condition comprising a zero injection equality constraint of each of the plurality of sub-systems and constraints ensuring consistency of boundary state variables of adjacent sub-systems; S3, solving the first linear model by an alternating direction multiplier method to obtain the intermediate state variables of each of the plurality of sub-systems; S4, performing a nonlinear transformation on the intermediate state variables of each of the plurality of sub-systems at a second stage, to obtain intermediate measured values; S5, establishing a second linear model of the power system for a third stage according to the intermediate measured values, the second linear model comprising a second target function and a second constraint condition, the second target function ensuring minimizing a sum of second residual squares and second penalty terms of the plurality of sub-systems, the second residual square being obtained according to final state variables of each sub-system and the intermediate measured values, the second penalty term ensuring bad data sparsity at the third stage, the second constraint condition comprising equality constraints ensuring consistency of the boundary state variables of adjacent sub-systems; and S6, solving the second linear model by the alternating direction multiplier method to obtain the final state variables of each of the plurality of sub-systems.

Embodiments of the present disclosure also provide a device for estimating a state of a power system, which includes: a processor; a memory configured to store an instruction executable by the processor; in which the processor is configured to: divide the power system into a plurality of sub-systems, each of the plurality of sub-systems comprising one or more buses as one or more nodes; establish a first linear model of the power system for a first stage, the first linear model comprising a first target function and a first constraint condition, the first target function ensuring minimizing a sum of first residual squares and first penalty terms of the plurality of sub-systems, the first residual square being obtained according to intermediate state variables of each sub-system, the first penalty term ensuring bad data sparsity at the first stage, the first constraint condition comprising a zero injection equality constraint of each of the plurality of sub-systems and constraints ensuring consistency of boundary state variables of adjacent sub-systems; solve the first linear model by an alternating direction multiplier method to obtain the intermediate state variables of each of the plurality of sub-systems; perform a nonlinear transformation on the intermediate state variables of each of the plurality of sub-systems at a second stage, to obtain intermediate measured values; establish a second linear model of the power system for a third stage according to the intermediate measured values, the second linear model comprising a second target function and a second constraint condition, the second target function ensuring minimizing a sum of second residual squares and second penalty terms of the plurality of sub-systems, the second residual square being obtained according to final state variables of each sub-system and the intermediate measured values, the second penalty term ensuring bad data sparsity at the third stage, the second constraint condition comprising equality constraints ensuring consistency of the boundary state variables of adjacent sub-systems; and solve the second linear model by the alternating direction multiplier method to obtain the final state variables of each of the plurality of sub-systems.

Embodiments of the present disclosure also provide a non-transitory computer readable storage medium having stored therein instructions that, when executed by a processor of a computing device, causes the computing device to perform a method for estimating a state of a power system, the method including: S1, dividing the power system into a plurality of sub-systems, each of the plurality of sub-systems comprising one or more buses as one or more nodes; S2, establishing a first linear model of the power system for a first stage, the first linear model comprising a first target function and a first constraint condition, the first target function ensuring minimizing a sum of first residual squares and first penalty terms of the plurality of sub-systems, the first residual square being obtained according to intermediate state variables of each sub-system, the first penalty term ensuring bad data sparsity at the first stage, the first constraint condition comprising a zero injection equality constraint of each of the plurality of sub-systems and constraints ensuring consistency of boundary state variables of adjacent sub-systems; S3, solving the first linear model by an alternating direction multiplier method to obtain the intermediate state variables of each of the plurality of sub-systems; S4, performing a nonlinear transformation on the intermediate state variables of each of the plurality of sub-systems at a second stage, to obtain intermediate measured values; S5, establishing a second linear model of the power system for a third stage according to the intermediate measured values, the second linear model comprising a second target function and a second constraint condition, the second target function ensuring minimizing a sum of second residual squares and second penalty terms of the plurality of sub-systems, the second residual square being obtained according to final state variables of each sub-system and the intermediate measured values, the second penalty term ensuring bad data sparsity at the third stage, the second constraint condition comprising equality constraints ensuring consistency of the boundary state variables of adjacent sub-systems; and S6, solving the second linear model by the alternating direction multiplier method to obtain the final state variables of each of the plurality of sub-systems.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
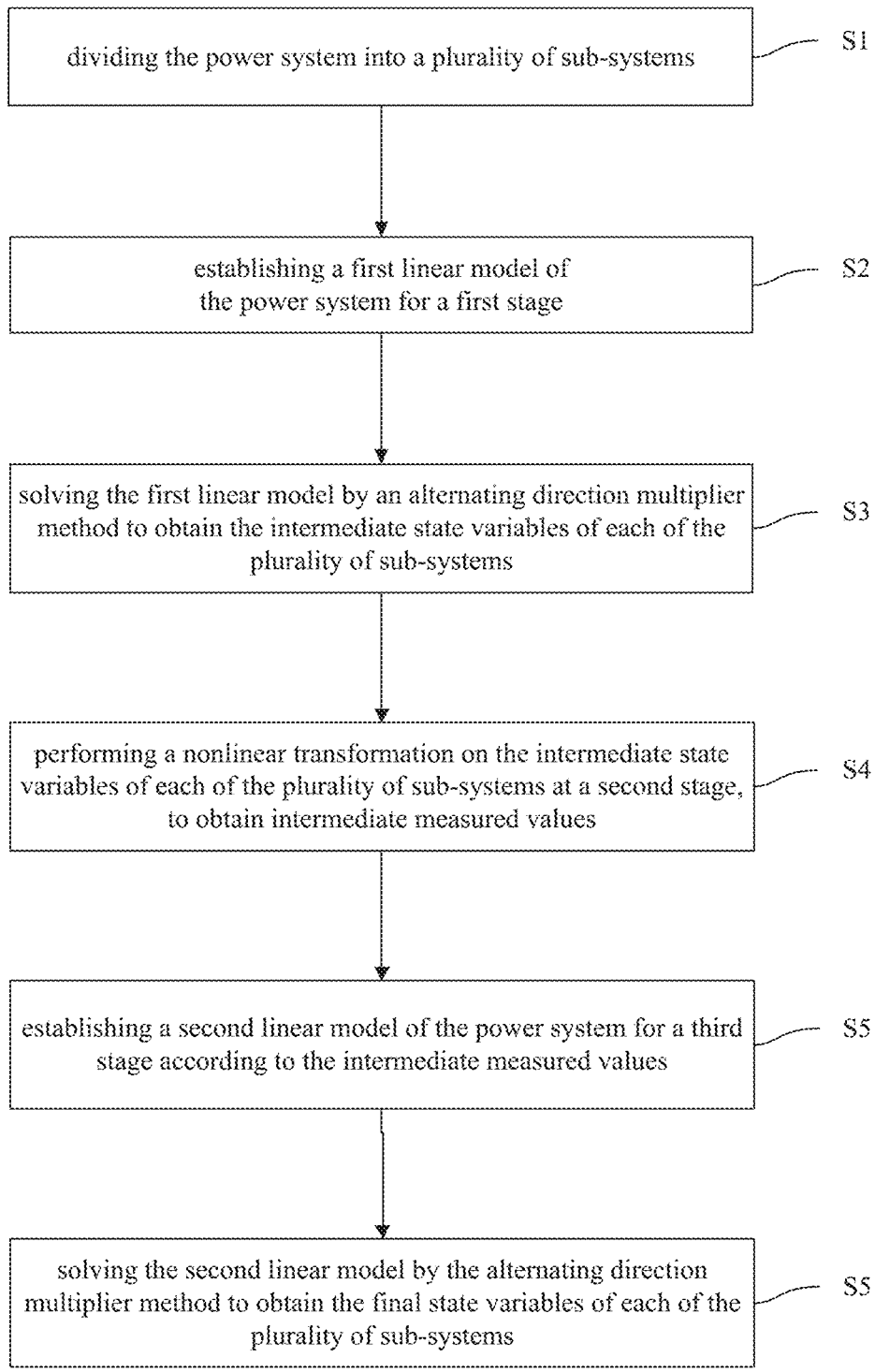
FIG. 1 is a flow chart showing a method for estimating a state of a power system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. In contrast, the present disclosure may include alternatives, modifications and equivalents within the spirit and scope of the appended claims. The same or similar elements and the elements having same or similar functions are denoted by like reference numerals throughout the descriptions.

In addition, terms such as "first" and "second" are used herein for purposes of description and are not intended to indicate or imply relative importance or significance. In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure. In the description of the present disclosure, "a plurality of" means two or more, unless specified otherwise.

The centralized management way is used to estimate the state of the power system in the related art, which has some problems, such as communication congestion, a bottleneck of processing information, maintenance issues, privacy issues, .etc. Therefore, embodiments of the present disclosure provide a method and a device for estimating a state of a power system, which may protect data privacy for each sub-system very well, suppress influence caused by bad data by using a very small amount of interactive information between each sub-system only, and have a high agility and robustness.

The above problems in the related art will encourage the centralized state estimation to become the distributed architecture, and the decision-making mechanism becomes an autonomous mode from a single mode. The distributed architecture does not require the centralized management and coordination for each sub-system and each sub-system is completely autonomous and computes its problems in parallel and interacts with the adjacent sub-system about interaction boundary information, so the state variable of the whole system may be obtained accurately and the influence caused by bad data may be suppressed.

FIG. 1 is a flow chart showing a method for estimating a state of a power system according to an embodiment of the present disclosure. As shown in FIG. 1, the method includes following steps.

In step S1, the power system is divided into a plurality of sub-systems, and each of the plurality of sub-systems includes one or more buses as one or more nodes and one or more generators attaching to each bus.

It is assumed that the power system is divided into R (which is a positive integer greater than or equal to 2) sub-systems, and sub-systems a and b are any two adjacent sub-systems in R sub-systems. A set of nodes of the sub-system a is defined as $M_j := \{a | j \in \hat{N}^a\}$, in which : represents a defining operator, j represents any node in the sub-system a, $\hat{N}^a$ represents the number of nodes in sub-system a, and the number of sub-systems including the node j is defined as $m_j := |M_j|$.

In step S2, a first linear model of the power system for a first stage is established, in which the first linear model is distributed and includes a first target function and a first constraint condition, the first target function ensures minimizing a sum of first residual squares and first penalty terms of the plurality of sub-systems, the first square is obtained according to intermediate state variables of each sub-system, the first penalty term ensures bad data sparsity at the first stage, the first constraint condition includes a zero injection equality constraint of each of the plurality of sub-systems and constraints ensuring consistency of boundary state variables of adjacent sub-systems.

Figure 2:
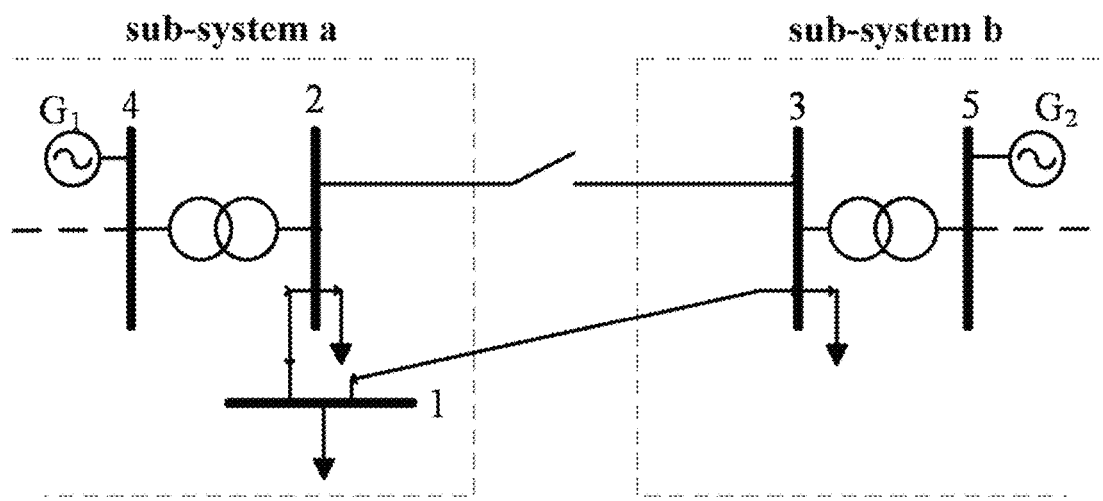
FIG. 2 is a schematic diagram illustrating solving at a first stage according to an embodiment of the present disclosure.

As shown in FIG. 2, the sub-systems a and b are any two adjacent sub-systems in the power system, and the sub-system a includes nodes 1, 2, and 4, which is defined as $N^a = \{1, 2, 4 \ldots\}$, and the sub-system b includes nodes 3 and 5, which is defined as $N^b = \{3, 5 \ldots\}$.

In an embodiment of the present disclosure, the intermediate state variables are denoted as $\{U_{a,i}, K_{a,ij}, L_{a,ij}\}$, in which $$U_{a,i} = V_{a,i}^2,$$

$$K_{a,ij} = V_{a,i}V_{a,j}\cos\theta_{a,ij},$$

$$L_{a,ij} = V_{a,i}V_{a,j}\sin\theta_{a,ij},$$

$$\theta_{a,ij} = \theta_{a,i} - \theta_{a,j},$$

where a represents a serial number of the sub-system, i and j represent a serial number of the node in the sub-system a respectively, ij represent a serial number of a branch in the sub-system a, $V_{a,i}$ represents a voltage amplitude of the node i in the sub-system a, $V_{a,j}$ represents a voltage amplitude of the node j in the sub-system a, $\theta_{a,i}$ represents a voltage phase angle of the node i in the sub-system a, $\theta_{a,j}$ represents a voltage phase angle of the node j in the sub-system a, and $\theta_{a,ij}$ represents a voltage phase angle of the branch ij in the sub-system a.

In an embodiment of the present disclosure, the first target function is denoted by a formula of $$\min \sum_{a=1}^{R} J_a^f(y_a, o_a^f) = \sum_{a=1}^{R} \left[\frac{1}{2}(z_a - B_a y_a - o_a^f)^T(z_a - B_a y_a - o_a^f) + \lambda\|o_a^f\|_1\right]$$

where min represents a minimizing operator, R represents the number of the plurality of sub-systems and is a positive integer greater than or equal to 2, $J_a^f$ represents a first target function of the sub-system a, $y_a$ represents an intermediate state variable vector of the sub-system a and is denoted as $\{U_{a,i}, K_{a,ij}, L_{a,ij}\}$, $o_a^f$ represents a bad data vector of the sub-system a at the first stage, $z_a$ represents a measured value vector of the sub-system a and includes a measured voltage amplitude value, a measured branch active power value, a measured branch reactive power value, a measured node injection active power value and a measured node injection reactive power value, $B_a$ represents a measured matrix of the sub-system a at the first stage, $\|\cdot\|_1$ represents 1-norm, $\lambda$ represents a constant, usually, the value of which may be 1.34e-2, and $\lambda\|o_a^f\|_1$ represents the first penalty term of the sub-system a.

In an embodiment of the present disclosure, elements in $B_a$ are determined according to formulas of $$P_{a,i}^m = \sum_{j \in i}^{j \neq i} [(g_{sh,i} + g_{ij})U_{a,i} - g_{ij}K_{a,ij} - b_{ij}L_{a,ij}] + \varepsilon_P$$

$$Q_{a,i}^m = \sum_{j \in i}^{j \neq i} [-(b_{sh,i} + b_{ij})U_{a,i} - g_{ij}L_{a,ij} + b_{ij}K_{a,ij}] + \varepsilon_Q$$

$$P_{a,ij}^m = (g_{sh,i} + g_{ij})U_{a,i} - g_{ij}K_{a,ij} - b_{ij}L_{a,ij} + \varepsilon_P$$

$$Q_{a,ij}^m = -(b_{sh,i} + b_{ij})U_{a,i} - g_{ij}L_{a,ij} + b_{ij}K_{a,ij} + \varepsilon_Q$$

$$U_{a,i}^m = U_{a,i} + \varepsilon_U$$

where $P_{a,i}^m$ represents a measured injection active power value of the node i in the sub-system a, $Q_{a,i}^m$ represents a measured injection reactive power value of the node i in the sub-system a, $P_{a,ij}^m$ represents a measured active power value of the branch ij in the sub-system a at terminal i, $Q_{a,ij}^m$ represents a measured reactive power value of the branch ij in the sub-system a at terminal i, $U_{a,i}^m$ represents a square of a measured voltage amplitude of the node i in the sub-system a, $g_{ij}$ represents a conductance of the branch ij, $g_{sh,i}$ represents a shunt conductance of the node i, $b_{ij}$ represents a susceptance of the branch ij, $b_{sh,i}$ represents a shunt susceptance of the node i, $\varepsilon_P$, $\varepsilon_Q$, $\varepsilon_{ij}$ represent error items of the measured active power value, the measured reactive power value and the square of the measured voltage amplitude respectively.

In an embodiment of the present disclosure, the zero injection equality constraint of the sub-system is denoted by a formula of $$E_a y_a = 0, \forall a$$

where $E_a$ represents a zero injection measured matrix of the sub-system a;

the constraint ensuring consistency of boundary state variables of each adjacent sub-systems is denoted by a formula of $$\begin{array}{l} K_{a,ij} = K_{b,ij} \\ L_{a,ij} = L_{b,ij} \end{array}, \quad \forall (i,j) \in \Gamma_{a,b}, \forall b \in \Delta_a, \forall a$$

where b represents a serial number of a sub-system adjacent to the sub-system a, $\Delta_a$ represents a set of sub-systems adjacent to the sub-system a, $\Gamma_{a,b}$ represents a set of call wires between the sub-system a and the sub-system b. For example, as shown in FIG. 2, in the call wire 1-3, the constraint $K_{a,13} = K_{b,13}$, $L_{a,13} = L_{b,13}$ to ensure the consistency of boundary state variables of adjacent sub-systems.

In step S3, the first linear model is solved by an alternating direction multiplier method to obtain the intermediate state variables of each of the plurality of sub-systems.

In an embodiment of the present disclosure, step S3 includes following step S30-S36.

In step S30, a first iteration subscript $t_1$ of the alternating direction multiplier method is initialized to be equal to 0, and a first convergence criteria $\varepsilon^f$ of the alternating direction multiplier method is set as $\varepsilon^f \in R^+$, where $R^+$ represents a set of real numbers.

In step S31, the intermediate state variable vector of the sub-system a is updated according to a formula of $$y_a^{t+1} = \hat{G}_{B,a}^{-1}(I - E_a^T \hat{B}_a)[B_a^T(z_a - o_a^{f,t}) + \rho^f \hat{y}_a^t] + \hat{B}_a^T z_{e,a}$$

where $\rho^f \in R^+$ represents a first penalty factor of the alternating direction multiplier method, the value of which is equal to 1, $\hat{G}_{B,a} = B_a^T B_a + \rho^f I$ represents an augmented information matrix at the first stage, I represents a unit matrix, $\hat{y}_a^t$ represents an auxiliary intermediate state variable vector of the sub-system a at $t_1^{th}$ iteration and includes auxiliary intermediate state variables $\{\hat{U}_a^t, \hat{K}_a^t, \hat{L}_a^t\}$ corresponding $\{U_a, K_a, L_a\}$, the initial value $\{\hat{U}_a^0, \hat{K}_a^0, \hat{L}_a^0\} = \{1,1,0\}$, $\hat{B}_a = (E_a \hat{G}_{B,a}^{-1} E_a^T)^{-1} E_a \hat{G}_{B,a}^{-1}$ represents an auxiliary measured matrix of the sub-system a at the first stage.

In step S32, the bad data variable vector of the sub-system a at the first stage is updated according to a formula of $$o_a^{f,t+1} = [z_a - B_a y_a^{t+1}]_\lambda^+$$

where $[\cdot]_\lambda^+$ represents a threshold operator, which corresponds to preforming an operation on each component in $z_a - B_a y_a^{t+1}$ according to a $R^+$ represents a set of real numbers $$[\xi_a(l)]_\lambda^+ = \begin{cases} \xi_a(l) + \lambda, & \xi_a(l) < -\lambda \\ \xi_a(l) - \lambda, & \xi_a(l) > \lambda \\ 0, & \text{others} \end{cases}$$

where l represents a serial number of each component, and $\xi_a(l)$ represents $l^{th}$ component in $z_a - B_a y_a^{t-1}$.

In step S33, mean values of boundary interactive auxiliary variables K and L of the sub-systems a and b are computed according to a formula of $$\overline{K}_{a,ij}^{t+1} = \frac{1}{2}(K_{a,ij}^{t+1} + K_{b,ij}^{t+1})$$
$$\overline{L}_{a,ij}^{t+1} = \frac{1}{2}(L_{a,ij}^{t+1} + L_{b,ij}^{t+1})$$
, $\forall (i,j) \in \Gamma_{a,b}, \forall b \in \Delta_a$.

In step S34, auxiliary intermediate state variables of the sub-system a are updated according to a formula of $$\hat{K}_{a,ij}^{t+1} = \hat{K}_{a,ij}^t + 2\overline{K}_{a,ij}^{t+1} - \overline{K}_{a,ij}^t - K_{a,ij}^{t+1}$$

$$\hat{L}_{a,ij}^{t+1} = \hat{L}_{a,ij}^t + 2\overline{L}_{a,ij}^{t+1} - \overline{L}_{a,ij}^t - L_{a,ij}^{t+1},$$

$\forall (i,j) \in \Gamma_{a,b}, \forall b \in \Delta_a$ where $\hat{K}_{a,ij}^{t+1}$, $\hat{L}_{a,ij}^{t+1}$ represent components of $\hat{y}_a^{t+1}$ respectively.

In step S35, it is judged whether the alternating direction multiplier method converges at the first stage.

In an embodiment of the present disclosure, S35 includes:
calculating a first original residual vector according to a formula of $$r^{f,t} = \frac{1}{2}\{|K_{a,ij}^t - K_{b,ij}^t|, |L_{a,ij}^t - L_{b,ij}^t| \mid \forall (i,j) \in \Gamma_{a,b}, \forall b \in \Delta_a, \forall a\};$$

calculating a first antithesis residual vector according to a formula of $$d^{f,t} = \{|\overline{K}_{a,ij}^t - \overline{K}_{a,ij}^{t-1}|, |\overline{L}_{a,ij}^t - \overline{L}_{a,ij}^{t-1}| \mid \forall (i,j) \in \Gamma_{a,b}, \forall b \in \Delta_a, \forall a\};$$

calculating a first total residual according to a formula of $$\delta^{f,t} = \left\| \binom{r^{f,t}}{d^{f,t}} \right\|_\infty;$$

judging whether $\delta^{f,t} \geq \varepsilon^f$; and
judging that the alternating direction multiplier method does not converge if $\delta^{f,t} \geq \varepsilon^f$, and judging that the alternating direction multiplier method converges if $\delta^{f,t} < \varepsilon^f$.

In step S36, $t_1 := t_1 + 1$ and S31 is returned if the alternating direction multiplier method does not converge, and S4 is executed if the alternating direction multiplier method converges.

In step S4, a nonlinear transformation is performed on the intermediate state variables of each of the plurality of sub-systems at a second stage to obtain intermediate measured values.

In an embodiment of the present disclosure, the nonlinear transformation at the second stage is performed on the intermediate state variables of sub-system a to obtain the intermediate measured values $\{a_{a,i}, \theta_{a,ij}, a_{a,ij}\}$ according to formulas of $$a_{a,i} = \ln U_{a,i}$$

$$a_{a,ij} = \ln(K_{a,ij}^2 + L_{a,ij}^2)$$

$$\theta_{a,ij} = \arctan\left(\frac{L_{a,ij}}{K_{a,ij}}\right)$$

In step S5, a second linear model of the power system for a third stage is established according to the intermediate measured values, the second linear model is distributed and includes a second target function and a second constraint condition, the second target function ensures minimizing a sum of second residual squares and second penalty terms of the plurality of sub-systems, the second residual square is obtained according to final state variables of each sub-system and the intermediate measured values, the second penalty term ensures bad data sparsity at the third stage, the second constraint condition includes equality constraints ensuring consistency of the boundary state variables of adjacent sub-systems.

In an embodiment of the present disclosure, the final state variables include voltage amplitudes and voltage phase angles of the nodes.

Figure 3:
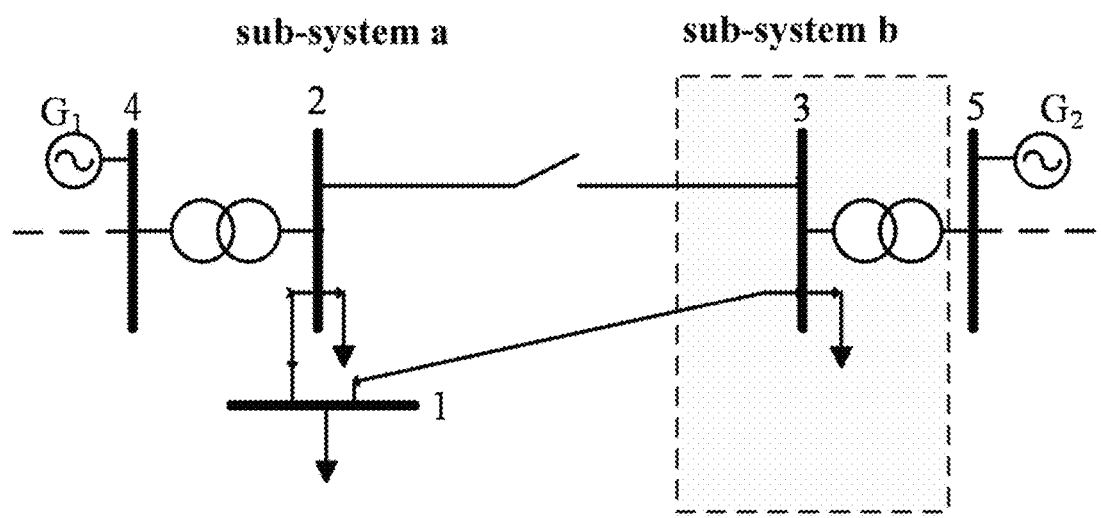
FIG. 3 is a schematic diagram illustrating solving at a third stage according to an embodiment of the present disclosure.

As shown in FIG. 3, the system includes 5 nodes and 2 sub-systems, in which the sub-system a includes nodes 1, 2, 3 and 4, and the sub-system b includes nodes 3 and 5, and the node 3 is the shared node by two sub-systems.

In an embodiment of the present disclosure, the second target function is denoted by a formula of $$\min J^s(x, o^s) =$$

$$\sum_{a=1}^R J_a^s(x_a, o_a^s) = \sum_{a=1}^R \left[\frac{1}{2}(\tilde{u}_a - C_a x_a - o_a^s)^T (\tilde{u}_a - C_a x_a - o_a^s) + \lambda \|o_a^s\|_1\right]$$

where $J_a^s$ represents a second target function of the sub-system a, $x_a$ represents a final state variable vector of the sub-system a, $o_a^s$ represents a bad data vector of the sub-system a at the second stage, $\lambda \|o_a^s\|_1$ represents the second penalty term of the sub-system a, $\tilde{u}_a$ represents the intermediate measured value vector obtained in S4, $C_a$ represents a measured matrix of the sub-system a at the third stage.

In an embodiment of the present disclosure, elements in $C_a$ are determined according to formulas of $$a_{a,ij} = a_{a,i} + a_{a,j} + \varepsilon_a$$

$$\theta_{a,ij} = \theta_{a,i} - \theta_{a,j} + \varepsilon_\theta$$

where $\varepsilon_a$, $\varepsilon_\theta$ represent error items of $a_{a,ij}$, $\theta_{a,ij}$ at the third stage respectively.

In an embodiment of the present disclosure, the equality constraint ensuring consistency of the boundary state variables of adjacent sub-systems is denoted by a formula of s. t. $x_{a,i} = x_{b,i}, \forall i \in \hat{N}_a^{BB}, \forall a$ where s. t. means subjecting to, $x_{a,i}$ represents a state variable of the node i of the sub-system a, $x_{b,i}$ represents a state variable of the node i of the sub-systems b, and $\hat{N}_a^{BB}$ represents a set of boundary nodes.

As shown in FIG. 3, equality constraint $x_{a,3} = x_{b,3}$ is introduced in the node 3.

As shown in FIG. 3, the system includes 5 nodes and 2 sub-systems, in which the sub-system a includes nodes 1, 2, 3 and 4, and the sub-system b includes nodes 3 and 5, and the node 3 is the shared node by two sub-systems.

In an embodiment of the present disclosure, step S6 includes following step S60-S66.

In step S60, a second iteration subscript $t_2$ of the alternating direction multiplier method is initialized to be equal to 0, and a second convergence criteria $\varepsilon^s$ of the alternating direction multiplier method is set as $\varepsilon^s \in R^+$.

In step S61, the final state variable vector of the sub-system a is updated according to a formula of $$x_a^{t+1} = \hat{G}_{C,a}^{-1}(C_a^T(\tilde{u}_a - o_a^{s,t}) + \rho^s \hat{x}_s^t), \forall a$$

where $\rho^s \in R^+$ represents a second penalty factor of the alternating direction multiplier method, the value of which is 1, $\hat{G}_{C,a} = C_a^T C_a + \rho^s I$ represents an augmented information matrix at the third stage, $\hat{x}_a^t$ represents an auxiliary final state variable vector of the sub-system a at $t_2^{th}$ iteration and an initial value of which is 0, and the initial value of which is 0.

In step S62, the bad data variable vector of the sub-system a at the third stage is updated according to a formula of $$o_a^{s,t+1} = [\tilde{u}_a - C_a x_a^{t+1}]_\lambda^+$$

In step S63, a mean value of state variables of any boundary node i of the sub-system a is computed according to a formula of $$\overline{x}_{a,i}^{t+1} = \frac{1}{m_i} \sum_{a \in M_i} x_{a,i}^{t+1}, \quad \forall i \in \hat{N}_a^{BB}$$

where $M_i$ represents a set of sub-systems including the node i, and $m_i$ represents the number of sub-systems including the node i.

In step S64, auxiliary final state variables of the sub-system a are updated according to a formula of $$\hat{x}_{a,i}^{t+1} = \hat{x}_{a,i}^t + 2\overline{x}_{a,i}^{t+1} - \overline{x}_{a,i}^{t+1} - x_{a,i}^{t+1}, \forall i \in \hat{N}_a^{BB}.$$

In step S65, it is judged whether the alternating direction multiplier method converges at the third stage.

In an embodiment of the present disclosure, S65 includes:
calculating a second original residual vector according to a formula of $$r^{s,t} = \frac{1}{2}\{|x_{a,i}^t - x_{b,i}^t| \,|\, \forall i \in \hat{N}_a^{BB}, \forall b \in \Delta_a, \forall a\};$$

calculating second antithesis residual vectors respectively according to formulas of $$d^{s,t} = \frac{1}{2}\{|\overline{x}_{a,i}^t - \overline{x}_{a,i}^{t-1}| \,|\, \forall i \in \hat{N}_a^{BB}, \forall b \in \Delta_a, \forall a\},$$

$$d^{f,t} = \{|\overline{K}_{a,ij}^t - \overline{K}_{a,ij}^{t-1}|, |\overline{L}_{a,ij}^t - \overline{L}_{a,ij}^{t-1}| \,|\, \forall (i,j) \in \Gamma_{a,b}, \forall b \in \Delta_a, \forall a\};$$

calculating a second total residual according to a formula of $$\delta^{s,t} = \left\| \begin{pmatrix} r^{s,t} \\ d^{s,t} \end{pmatrix} \right\|_\infty; \quad (30)$$

judging whether $\delta^{s,t} \geq \varepsilon^s$; and
judging that the alternating direction multiplier method does not converge if $\delta^{s,t} \geq \varepsilon^s$, and judging that the alternating direction multiplier method converges if $\delta^{s,t} < \varepsilon^s$.

In step S66, $t_2 := t_2 1$ and S61 is returned if the alternating direction multiplier method does not converge, and $x_a$ of the sub-system a is outputted as the final state variables of the sub-system a in the power system if the alternating direction multiplier method converges.

Technical solutions provided in embodiments of the present disclosure have the following advantages.

(1) Scalability: after the power system is divided into the plurality of sub-systems, the sub-problem scale of each sub-system is very small;

(2) Maintainability: in this technical solution, each sub-system needs to perform the collaborative iteration with adjacent sub-systems, and the control center does not require the coordination process and does not need to maintain a large centralized model;

(3) Privacy: each sub-system only needs to interact with the adjacent sub-system about boundary interaction information in the first stage and the third stage, so the data privacy within the sub-system is well protected.

In order to realize the above objective, embodiments of the present disclosure also provide a device for estimating a state of a power system, the device includes a processor; a memory configured to store an instruction executable by the processor; in which the processor is configured to perform the method for estimating a state of a power system according to any one of above embodiments.

In order to realize the above objective, embodiments of the present disclosure also provide a non-transitory computer readable storage medium having stored therein instructions that, when executed by a processor of a computing device, causes the computing device to perform the method for estimating a state of a power system according to any one of above embodiments.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown. Also, two or more boxes shown in succession in the flow chart may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. Also, the flow chart is relatively self-explanatory and is understood by those skilled in the art to the extent that software and/or hardware can be created by one with ordinary skill in the art to carry out the various logical functions as described herein.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for estimating a state of a power system, comprising:

providing one or more computing devices configured to receive transmitted information from a plurality of sub-systems of the power system, including one or more buses as one or more nodes, the transmitted information including: a serial number of the sub-system, a serial number of the node in the sub-system, a serial number of a branch in the sub-system, a voltage amplitude of the node in the sub-system, a voltage amplitude of the node, in the sub-system, a voltage phase angle of the node i in the sub-system, a voltage phase angle of the node in the sub-system, a voltage phase angle of the branch in the sub-system, wherein the one or more computing devices perform the following method:

S1, dividing the power system into the plurality of sub-systems, each of the plurality of sub-systems comprising the one or more buses as one or more nodes;

S2, establishing a first linear model of the power system for a first stage, the first linear model comprising a first target function and a first constraint condition, the first target function ensuring minimizing a sum of first residual squares and first penalty terms of the plurality of sub-systems, the first residual square being obtained according to intermediate state variables of each sub-system, the first penalty term ensuring bad data sparsity at the first stage, the first constraint condition comprising a zero injection equality constraint of each of the plurality of sub-systems and constraints ensuring consistency of boundary state variables of adjacent sub-systems;

S3, solving the first linear model by an alternating direction multiplier method to obtain the intermediate state variables of each of the plurality of sub-systems;

S4, performing a nonlinear transformation on the intermediate state variables of each of the plurality of sub-systems at a second stage, to obtain intermediate measured values;

S5, establishing a second linear model of the power system for a third stage according to the intermediate measured values, the second linear model comprising a second target function and a second constraint condition, the second target function ensuring minimizing a sum of second residual squares and second penalty terms of the plurality of sub-systems, the second residual square being obtained according to final state variables of each sub-system and the intermediate measured values, the second penalty term ensuring bad data sparsity at the third stage, the second constraint condition comprising equality constraints ensuring consistency of the boundary state variables of adjacent sub-systems; and S6, solving the second linear model by the alternating direction multiplier method to obtain the final state variables of each of the plurality of sub-systems and displaying the estimated state of the power system to a user based on the final state variables of each of the plurality of sub-systems;

wherein the intermediate state variables are denoted as $\{U_{a,i}, K_{a,ij}, L_{a,ij}\}$, in which $U_{a,i} = V_{a,i}^2$, $K_{a,ij} = V_{a,i} V_{a,j} \cos\theta_{a,ij}$, $L_{a,ij} = V_{a,i} V_{a,j} \sin\theta_{a,ij}$, $\theta_{a,ij} = \theta_{a,i} - \theta_{a,j}$, where a represents the serial number of the sub-system, i and j represent the serial number of the node in the sub-system a respectively, ij represent the serial number of the branch in the sub-system a, $V_{a,i}$ represents the voltage amplitude of the node i in the sub-system a, $V_{a,j}$ represents the voltage amplitude of the node j in the sub-system a, $\theta_{a,i}$ represents the voltage phase angle of the node i in the sub-system a, $\theta_{a,j}$ represents the voltage phase angle of the node j in the sub-system a, and $\theta_{a,ij}$ represents the voltage phase angle of the branch ij in the sub-system a;

wherein the final state variables comprise voltage amplitudes and voltage phase angles of the nodes.

2. The method according to claim 1, wherein the first target function is denoted by a formula of $$\min \sum_{a=1}^{R} J_a^f(y_a, o_a^f) = \sum_{a=1}^{R} \left[ \frac{1}{2}(z_a - B_a y_a - o_a^f)^T (z_a - B_a y_a - o_a^f) + \lambda \| o_a^f \|_1 \right]$$

where min represents a minimizing operator, R represents the number of the plurality of sub-systems and is a positive integer greater than or equal to 2, $J_a^f$ represents a first target function of the sub-system a, $y_a$ represents an intermediate state variable vector of the sub-system a and is denoted as $\{U_{a,i}, K_{a,ij}, L_{a,ij}\}$, $o_a^f$ represents a bad data vector of the sub-system a at the first stage, $z_a$ represents a measured value vector of the sub-system a and comprises a measured voltage amplitude value, a measured branch active power value, a measured branch reactive power value, a measured node injection active power value and a measured node injection reactive power value, $B_a$ represents a measured matrix of the sub-system a at the first stage, $\| \|_1$ represents 1-norm, $\lambda$ represents a constant, and $\lambda \| o_a^f \|_1$ represents the first penalty term of the sub-system a.

3. The method according to claim 2, wherein elements in $B_a$ are determined according to formulas of $$P_{a,i}^m = \sum_{j \in i}^{j \neq i} [(g_{sh,i} + g_{ij})U_{a,i} - g_{ij}K_{a,ij} - b_{ij}L_{a,ij}] + \varepsilon_P$$

$$Q_{a,i}^m = \sum_{j \in i}^{j \neq i} [-(b_{sh,i} + b_{ij})U_{a,i} - g_{ij}L_{a,ij} + b_{ij}K_{a,ij}] + \varepsilon_Q$$

$$P_{a,ij}^m = (g_{sh,i} + g_{ij})U_{a,i} - g_{ij}K_{a,ij} - b_{ij}L_{a,ij} + \varepsilon_P$$

$$Q_{a,ij}^m = -(b_{sh,i} + b_{ij})U_{a,i} - g_{ij}L_{a,ij} + b_{ij}K_{a,ij} + \varepsilon_Q$$

$$U_{a,i}^m = U_{a,i} + \varepsilon_U$$

where $P_{a,i}^m$ represents a measured injection active power value of the node i in the sub-system system a, $Q_{a,i}^m$ represents a measured injection reactive power value of the node i in the sub-system a, $P_{a,ij}^m$ represents a measured active power value of the branch ij in the sub-system a at terminal i, $Q_{a,ij}^m$ represents a measured reactive power value of the branch ij in the sub-system a at terminal i, $U_{a,i}^m$ represents a square of a measured voltage amplitude of the node i in the sub-system a, $g_{ij}$ represents a conductance of the branch ij, $g_{sh,i}$ represents a shunt conductance of the node i, $b_{ij}$ represents a susceptance of the branch ij, $b_{sh,i}$ represents a shunt susceptance of the node i, $\varepsilon_P, \varepsilon_Q, \varepsilon_U$ represent error items of the measured active power value, the measured reactive power value and the square of the measured voltage amplitude respectively.

4. The method according to claim 2, wherein the zero injection equality constraint of the sub-system is denoted by a formula of $E_a y_a = 0, \forall a$ where $E_a$ represents a zero injection measured matrix of the sub-system a;

the constraint ensuring consistency of boundary state variables of adjacent sub-systems is denoted by a formula of $$\begin{aligned} K_{a,ij} &= K_{b,ij} \\ L_{a,ij} &= L_{b,ij} \end{aligned}, \forall (i,j) \in \Gamma_{a,b}, \forall b \in \Delta_a, \forall a$$

where b represents a serial number of a sub-system adjacent to the sub-system a, $\Delta_a$ represents a set of sub-systems adjacent to the sub-system a, $\Gamma_{a,b}$ represents a set of call wires between the sub-system a and the sub-system b.

5. The method according to claim 4, wherein S3 comprises:

S30, initializing a first iteration subscript $t_1$ of the alternating direction multiplier method to be equal to 0, and setting a first convergence criteria $\varepsilon^f$ of the alternating direction multiplier method as $\varepsilon^f \in R^+$, where $R^+$ represents a set of real numbers;

S31, updating the intermediate state variable vector of the sub-system a according to a formula of $y_a^{t+1} = \hat{G}_{B,a}^{-1}(I - E_a^T \hat{B}_a)[B_a^T(z_a - o_a^{f,t}) + \rho^f \hat{y}_a^t] + \hat{B}_a^T z_{e,a}$ where $\rho^f \in R^+$ represents a first penalty factor of the alternating direction multiplier method, $\hat{G}_{B,a} = B_a^T B_a + \rho^f I$ represents an augmented information matrix at the first stage, I represents a unit matrix, $\hat{y}_a^t$ represents an auxiliary intermediate state variable vector of the sub-system a at $t_1^{th}$ iteration and comprises auxiliary intermediate state variables $\{\hat{U}_a^t, \hat{K}_a^t, \hat{L}_a^t\}$ corresponding to $\{U_a, K_a, L_a\}$, $\hat{B}_a = (E_a \hat{G}_{B,a}^{-1} E_a^T)^{-1} E_a \hat{G}_{B,a}^{-1}$ represents an auxiliary measured matrix of the sub-system a at the first stage;

S32, updating the bad data variable vector of the sub-system a at the first stage according to a formula of $o_a^{f,t+1} = [z_a - B_a y_a^{t+1}]_\lambda^+$ where $[\cdot]_\lambda^+$ represents a threshold operator, which corresponds to preforming an operation on each component in $z_a - B_a y_a^{t+1}$ according to a formula of $$[\xi_a(l)]_\lambda^+ = \begin{cases} \xi_a(l) + \lambda, & \xi_a(l) < -\lambda \\ \xi_a(l) - \lambda, & \xi_a(l) > \lambda \\ 0, & \text{others} \end{cases}$$

where l represents a serial number of each component, and $\xi_a(l)$ represents $l^{th}$ component in $z_a - B_a y_a^{t+1}$;

S33, computing mean values of boundary interactive auxiliary variables K and L of the sub-systems a and b according to a formula of $$\overline{K}_{a,ij}^{t+1} = \frac{1}{2}(K_{a,ij}^{t+1} + K_{b,ij}^{t+1})$$
$$\overline{L}_{a,ij}^{t+1} = \frac{1}{2}(L_{a,ij}^{t+1} + L_{b,ij}^{t+1})$$, $\forall (i,j) \in \Gamma_{a,b}, \forall b \in \Delta_a$;

S34, updating auxiliary intermediate state variables of the sub-system a according to a formula of $$\hat{K}_{a,ij}^{t+1} = \hat{K}_{a,ij}^t + 2\overline{K}_{a,ij}^{t+1} - \overline{K}_{a,ij}^t - K_{a,ij}^{t+1}$$

$$\hat{L}_{a,ij}^{t+1} = \hat{L}_{a,ij}^t + 2\overline{L}_{a,ij}^{t+1} - \overline{L}_{a,ij}^t - L_{a,ij}^{t+1},$$

$\forall (i,j) \in \Gamma_{a,b}, \forall b \in \Delta_a$ where $\hat{K}_{a,ij}^{t+1}$, $\hat{L}_{a,ij}^{t+1}$ represent components of $\hat{y}_a^{t+1}$ respectively;

S35, judging whether the alternating direction multiplier method converges at the first stage; and S36, $t_1 := t_1 + 1$ and returning to S31 if the alternating direction multiplier method does not converge, and executing S4 if the alternating direction multiplier method converges.

6. The method according to claim 5, wherein S35 comprises:

calculating a first original residual vector according to a formula of $$r^{f,i} = \frac{1}{2}\{|K_{a,ij}^i - K_{b,ij}^i|, |L_{a,ij}^i - L_{b,ij}^i|| \forall (i,j) \in \Gamma_{a,b}, \forall b \in \Delta_a, \forall a\};$$

calculating a first antithesis residual vector according to a formula of $$d^{f,t}\{|\overline{K}_{a,ij}^t - \overline{K}_{a,ij}^{t-1}|, |\overline{L}_{a,ij}^t - \overline{L}_{a,ij}^{t-1}||\forall(i,j) \in \Gamma_{a,b}, \forall b \in \Delta_a, \forall a\};$$

calculating a first total residual according to a formula of $$\delta^{f,t} = \left\|\begin{pmatrix} r^{f,t} \\ d^{f,t} \end{pmatrix}\right\|_\infty;$$

judging whether $\delta^{f,t} \geq \varepsilon^f$; and judging that the alternating direction multiplier method does not converge if $\delta^{f,t} \geq \varepsilon^f$, and judging that the alternating direction multiplier method converges if $\delta^{f,t} < \varepsilon^f$.

7. The method according to claim 6, wherein S4 comprises:

performing the nonlinear transformation on the intermediate state variables of sub-system a to obtain the intermediate measured values $\{a_{a,i}, \theta_{a,ij}, a_{a,ij}\}$ according to formulas of $$\alpha_{a,i} = \ln U_{a,i}$$
$$\alpha_{a,ij} = \ln(K_{a,ij}^2 + L_{a,ij}^2)$$
$$\theta_{a,ij} = \arctan\left(\frac{L_{a,ij}}{K_{a,ij}}\right).$$

8. The method according to claim 7, wherein the second target function is denoted by a formula of $$\min J^s(x, o^s) = \sum_{a=1}^R J_a^s(x_a, o_a^s) = \sum_{a=1}^R \left[\frac{1}{2}(\tilde{u}_a - C_a x_a - o_a^s)^T(\tilde{u}_a - C_a x_a - o_a^s) + \lambda\|o_a^s\|_1\right]$$

where $J_a^s$ represents a second target function of the sub-system a, $x_a$ represents a final state variable vector of the sub-system a, $o_a^s$ represents a bad data vector of the sub-system a at the second stage, $\lambda\|o_a^s\|_1$ represents the second penalty term of the sub-system a, $\tilde{u}_a$ represents the intermediate measured value vector obtained in S4, $C_a$ represents a measured matrix of the sub-system a at the second stage.

9. The method according to claim 8, wherein elements in c, are determined according to formulas of $$a_{a,ij} = a_{a,i} + a_{a,i} + \varepsilon_a$$

$$\theta_{a,ij} = \theta_{a,i} - \theta_{a,j} + \varepsilon_\theta$$

where $\varepsilon_a$, $\varepsilon_\theta$ represent error items of $a_{a,ij}$, $\theta_{a,ij}$ at the third stage respectively.

10. The method according to claim 9, wherein the equality constraint ensuring consistency of the boundary state variables of adjacent sub-systems is denoted by a formula of s. t. $x_{a,i} = x_{b,i}$, $\forall i \in \hat{N}_a^{BB}$, $\forall a$ where s. t. means subjecting to, $x_{a,i}$ represents a state variable of the node i of the sub-system a, $x_{b,i}$ represents a state variable of the node i of the sub-system b, and $\hat{N}_a^{BB}$ represents a set of boundary nodes.

11. The method according to claim 10, wherein S6 comprises:

S60, initializing a second iteration subscript $t_2$ of the alternating direction multiplier method to be equal to 0, and setting a second convergence criteria $\varepsilon^s$ of the alternating direction multiplier method as $\varepsilon^s \in R^+$;

S61, updating the final state variable vector of the sub-system a according to a formula of $$x_a^{t+1} \hat{G}_{C,a}^{-1}(C_a^T(\tilde{u} - o_s^{s,t}) + \rho^s \hat{x}_a^t), \forall a$$

where $\rho^s \in R^+$ represents a second penalty factor of the alternating direction multiplier method, $\hat{G}_{C,a} = C_a^T C_a + \rho^s I$ represents an augmented information matrix at the third stage, $\hat{x}_a^t$ represents an auxiliary final state variable vector of the sub-system a at $t_2^{th}$ iteration and an initial value of which is 0;

S62, updating the bad data variable vector of the sub-system a at the third stage according to a formula of $$o_a^{s,t+1} = [\tilde{u}_a - C_a x_a^{t+1}]_\lambda^+;$$

S63, computing a mean value of state variables of any boundary node i of the sub-system a according to a formula of $$\overline{x}_{a,i}^{t+1} = \frac{1}{m_i} \sum_{a \in M_i} x_{a,i}^{t+1}, \forall i \in \hat{N}_a^{BB}$$

where $M_i$ represents a set of sub-systems comprising the node i, and $m_i$ represents the number of sub-systems comprising the node i;

S64, updating auxiliary final state variables of the sub-system a according to a formula of $$\hat{x}_{a,i}^{t+1} = \hat{x}_{a,i}^{t} + 2\overline{x}_{a,i}^{t+1} - \overline{x}_{a,i}^{t} - x_{a,i}^{t+1}, \forall i \in \hat{N}_a^{BB};$$

S65, judging whether the alternating direction multiplier method converges at the third stage; and S66, $t_2:t_2+1$ and returning to S61 if the alternating direction multiplier method does not converge, and outputting $x_a$ of the sub-system a as the final state variables of the sub-system a in the power system if the alternating direction multiplier method converges.

12. The method according to claim 11, wherein S65 comprises:

calculating a second original residual vector according to a formula of $$r^{s,t} = \frac{1}{2} \{|x_{a,i}^t - x_{b,i}^t| \,|\, \forall i \in \hat{N}_a^{BB}, \forall b \in \Delta_a, \forall a\};$$

calculating second antithesis residual vectors according to formulas of, $$d^{s,t} = \frac{1}{2} \{|\overline{x}_{a,i}^t - \overline{x}_{a,i}^{t-1}| \,|\, \forall i \in \hat{N}_a^{BB}, \forall b \in \Delta_a, \forall a\},$$

$$d^{f,t} = \{|\overline{K}_{a,ij}^t - \overline{K}_{a,ij}^{t-1}|, |\overline{L}_{a,ij}^t - \overline{L}_{a,ij}^{t-1}| \,|\, \forall (i,j) \in \Gamma_{a,b}, \forall b \in \Delta_a, \forall a\};$$

calculating a second total residual according to a formula of $$\delta^{s,t} = \left\| \begin{pmatrix} r^{s,t} \\ d^{s,t} \end{pmatrix} \right\|_\infty;$$

judging whether $\delta^{s,t} \geq \varepsilon^s$; and judging that the alternating direction multiplier method does not converge if $\delta^{s,t} \geq \varepsilon^s$, and judging that the alternating direction multiplier method converges if $\delta^{s,t} < \varepsilon^s$.

13. A device for estimating a state of a power system, comprising:

a processor;

a memory configured to store an instruction executable by the processor;

wherein the processor is configured to:

divide the power system into a plurality of sub-systems, each of the plurality of sub-systems comprising one or more buses as one or more nodes;

receive transmitted information from the plurality of sub-systems of the power system, including the one or more buses as the one or more nodes, the transmitted information including: a serial number of the sub-system, a serial number of the node in the sub-system, a serial number of a branch in the sub-system, a voltage amplitude of the node in the sub-system, a voltage amplitude of the node, in the sub-system, a voltage phase angle of the node i in the sub-system, a voltage phase angle of the node in the sub-system, a voltage phase angle of the branch in the sub-system;

establish a first linear model of the power system for a first stage, the first linear model comprising a first target function and a first constraint condition, the first target function ensuring minimizing a sum of first residual squares and first penalty terms of the plurality of sub-systems, the first residual square being obtained according to intermediate state variables of each sub-system, the first penalty term ensuring bad data sparsity at the first stage, the first constraint condition comprising a zero injection equality constraint of each of the plurality of sub-systems and constraints ensuring consistency of boundary state variables of adjacent sub-systems;

solve the first linear model by an alternating direction multiplier method to obtain the intermediate state variables of each of the plurality of sub-systems;

perform a nonlinear transformation on the intermediate state variables of each of the plurality of sub-systems at a second stage, to obtain intermediate measured values;

establish a second linear model of the power system for a third stage according to the intermediate measured values, the second linear model comprising a second target function and a second constraint condition, the second target function ensuring minimizing a sum of second residual squares and second penalty terms of the plurality of sub-systems, the second residual square being obtained according to final state variables of each sub-system and the intermediate measured values, the second penalty term ensuring bad data sparsity at the third stage, the second constraint condition comprising equality constraints ensuring consistency of the boundary state variables of adjacent sub-systems; and solve the second linear model by the alternating direction multiplier method to obtain the final state variables of each of the plurality of sub-systems, wherein the intermediate state variables are denoted as $\{U_{a,i}, K_{a,ij}, L_{a,ij}\}$, in which $U_{a,i} = V_{a,i}^2$, $K_{a,ij} = V_{a,i} V_{a,j} \cos\theta_{a,ij}$, $L_{a,ij} = V_{a,i} V_{a,j} \sin\theta_{a,ij}$, $\theta_{a,ij} = \theta_{a,i} - \theta_{a,j}$, where a represents a serial number of the sub-system, i and j represent a serial number of the node in the sub-system a respectively, ij represent a serial number of a branch in the sub-system a, $V_{a,i}$ represents a voltage amplitude of the node i in the sub-system a, $V_{a,j}$ represents a voltage amplitude of the node j in the sub-system a, $\theta_{a,i}$ represents a voltage phase angle of the node i in the sub-system a, $\theta_{a,j}$ represents a voltage phase angle of the node j in the sub-system a, and $\theta_{a,ij}$ represents a voltage phase angle of the branch in the sub-system a, wherein the final state variables comprise voltage amplitudes and voltage phase angles of the nodes;

wherein the processor is further configured to:

determine whether the voltage amplitude of the node exceeds an operational amplitude limit and whether the voltage phase angle of the node exceeds an operational voltage phase angle limit; and when the voltage amplitude of the node exceeds the operational amplitude limit, or the voltage phase angle of the node exceeds the operational voltage phase angle limit, display the estimated state of the power system to a user based on the final state variables of each of the plurality of sub-systems.

14. A non-transitory computer readable storage medium having stored therein instructions that, when executed by a processor of a computing device, causes the computing device to perform a method for estimating a state of a power system, the method comprising:

dividing the power system into a plurality of sub-systems, each of the plurality of sub-systems comprising one or more buses as one or more nodes;

receiving transmitted information from the plurality of sub-systems of the power system, including the one or more buses as one or more nodes, the transmitted information including: a serial number of the sub-system, a serial number of the node in the sub-system, a serial number of a branch in the sub-system, a voltage amplitude of the node in the sub-system, a voltage amplitude of the node, in the sub-system, a voltage phase angle of the node i in the sub-system, a voltage phase angle of the node in the sub-system, a voltage phase angle of the branch in the sub-system;

establishing a first linear model of the power system for a first stage, the first linear model comprising a first target function and a first constraint condition, the first target function ensuring minimizing a sum of first residual squares and first penalty terms of the plurality of sub-systems, the first residual square being obtained according to intermediate state variables of each sub-system, the first penalty term ensuring bad data sparsity at the first stage, the first constraint condition comprising a zero injection equality constraint of each of the plurality of sub-systems and constraints ensuring consistency of boundary state variables of adjacent sub-systems;

solving the first linear model by an alternating direction multiplier method to obtain the intermediate state variables of each of the plurality of sub-systems;

performing a nonlinear transformation on the intermediate state variables of each of the plurality of sub-systems at a second stage, to obtain intermediate measured values;

establishing a second linear model of the power system for a third stage according to the intermediate measured values, the second linear model comprising a second target function and a second constraint condition, the second target function ensuring minimizing a sum of second residual squares and second penalty terms of the plurality of sub-systems, the second residual square being obtained according to final state variables of each sub-system and the intermediate measured values, the second penalty term ensuring bad data sparsity at the third stage, the second constraint condition comprising equality constraints ensuring consistency of the boundary state variables of adjacent sub-systems; and solving the second linear model by the alternating direction multiplier method to obtain the final state variables of each of the plurality of sub-systems;

wherein the intermediate state variables are denoted as $\{U_{a,i}, K_{a,ij}, L_{a,ij}\}$, in which $$U_{a,i} = V_{a,i}^2,$$

$$K_{a,ij} = V_{a,i}V_{a,j}\cos\theta_{a,ij},$$

$$L_{a,ij} = V_{a,i}V_{a,j}\sin\theta_{a,ij},$$

$$\theta_{a,ij} = \theta_{a,i} - \theta_{a,j},$$

where a represents a serial number of the sub-system, i and j represent a serial number of the node in the sub-system a respectively, ij represent a serial number of a branch in the sub-system a, $V_{a,i}$ represents a voltage amplitude of the node i in the sub-system a, $V_{a,j}$ represents a voltage amplitude of the node j in the sub-system a, $\theta_{a,i}$ represents a voltage phase angle of the node i in the sub-system a, $\theta_{a,j}$ represents a voltage phase angle of the node j in the sub-system a, and $\theta_{a,ij}$ represents a voltage phase angle of the branch ij in the sub-system a, wherein the final state variables comprise voltage amplitudes and voltage phase angles of the nodes;

wherein the estimated state of the power system is displayed to a user, including a determination whether the voltage amplitude of the node exceeds an operational amplitude limit and whether the voltage phase angle of the node exceeds an operational voltage phase angle limit.

* * * * *